United States Patent [19]

Hamilton

[11] Patent Number: 4,991,108
[45] Date of Patent: Feb. 5, 1991

[54] DATA PROCESSOR PRINTER ARRANGEMENT

[76] Inventor: Cecil C. Hamilton, 12 Murray Hill Dr., Atco, N.J. 08004

[21] Appl. No.: 418,338

[22] Filed: Oct. 6, 1989

[51] Int. Cl.⁵ .............................................. G06F 3/00
[52] U.S. Cl. .................................. 364/514; 364/518
[58] Field of Search ............................... 364/518–520; 346/154; 358/296

[56] References Cited

U.S. PATENT DOCUMENTS 4,516,139  5/1985  Takiguchi ........................... 358/296
4,682,190  7/1987  Ikeda .................................. 346/154

Primary Examiner—Arthur G. Evans
Attorney, Agent, or Firm—Z. T. Wobensmith, III

[57] ABSTRACT

The present system employs, in a preferred embodiment, four principal stations connected by a network. At a first station text information is accepted from documents and the like and is converted into machine readable signals. At a second station graphic information is accepted from documents and the like and is converted into machine readable signals. At the second station graphic information may be expanded and reduced to enhance the graphic displays. At a third station there resides a major computer system which provides control signals and accepts information from both the first and second stations and formats such information into page forms. At a fourth station there is located a laser printer. The major computer provides, over the network, page formatted information to the laser printer which in turn prints text and graphics of "print shop" quality.

10 Claims, 1 Drawing Sheet

DATA PROCESSOR PRINTER ARRANGEMENT

Computer systems have been used for quite some time as the reservoir of information for printing summaries, letters, reports, etc. In the prior art such techniques have employed typewriters, dot printers, daisy wheel printers and the like to actually "print" the information on the webbing material, whatever the webbing material might be. Such printing has not been of "print shop" quality and only recently has been of "good" typewriter quality. In recent times, the introduction of the laser printer has provided "good" typewriter quality. Be that as it may, the generation of the information by electronic means (the word processor being a good example) has had a number of advantages over the provision of information for offset printing techniques and other printing techniques of the print shops. For instance, the technology to create a "plate" for offset printing requires, relatively speaking, a great deal of time and expense and virtually no flexibility in the event of a detected error upon proofreading after the "plate" has been fabricated.

On the other hand, employing print shop techniques to "print" graphic displays has been preferable to the use of computers. Although computers can create very acceptable graphics on a CRT, or terminal screen, when it comes to "printing", the graphic products of the computer printer leave something to be desired. The voids between screen pixels are not discernible to the human eye when such graphics appear on a CRT, or monitor screen, because the screen phosphors spread each dot image out and the voids are filled in. With the direct application of dot information to a printer, the voids are more pronounced and the density of the printed image or pattern is lacking. The present system provides a basis for enhancing printing of both text and graphics from computer compiled information.

SUMMARY OF THE DISCLOSURE

The present system employs, at a first station, a text reader which scans and reads text material from original documents. The information on the original documents can be presented in a number of different fonts and page sizes and the present text reader will convert such text information into intelligent machine readable signals to be used with the present system while the overall system can convert the original information into different fonts and page sizes if the user so desires. At a second station, in a preferred embodiment of the present system, there is employed an art-imager device, which scans graphic materials and converts such materials into machine readable signals. The art-imager device can process the scanned information so that the image is enlarged, for instance three or four times. The art-imager station includes a data processor device which acts to store the machine readable signals and further acts to reduce the scanned information so as to reduce the voids that occur between dot positions. At a third station, in a preferred embodiment of the present system, there is employed a master computer. The master computer is connected through a network to the first and second stations and to a laser printer station. The master computer sends control signals to all of the stations on the network and accepts the machine readable signals from the first and second stations, manipulates the machine readable signals into page formats, transmits the machine readable signals, in page formats, to the laser printer system whereat the text and graphics are printed.

The features and objects of the present invention will become better understood in view of the following description taken in conjunction with the drawings wherein:

FIG. 2 is a graphic and text display which has been printed by the present system.

Figure 1:
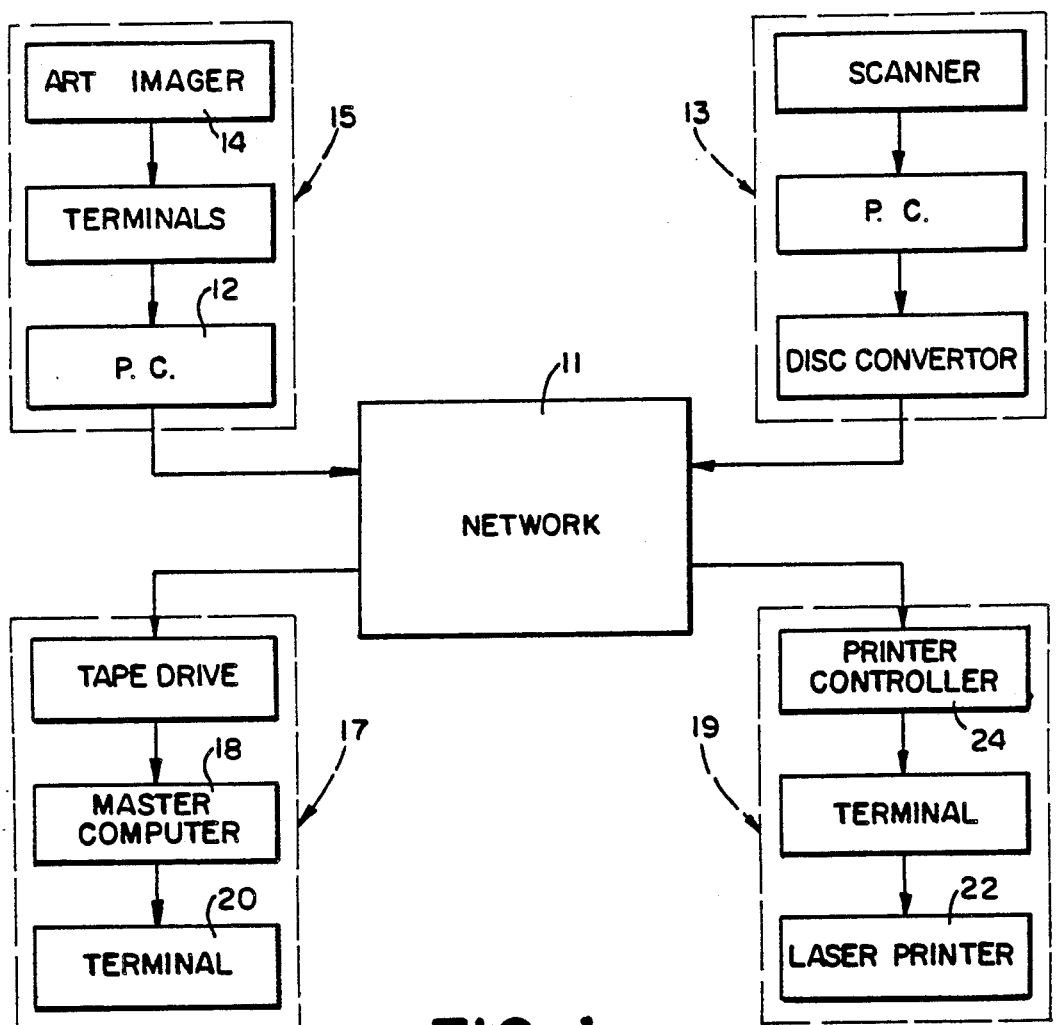
FIG. 1 is a block diagram of the system of the preferred embodiment.

In the prior art, when a computer has been used as the driving intelligence source for a printer, it has been used to compile information for writing checks, as part of a payroll, or letters, or the like. Generally such systems have provided for permitting the user to see, on a screen, the format that was going to be printed. This has been accomplished mainly by employing a memory, such as bit map memory, to store (a pixel at a time) the graphic information which makes up the pattern, or a design, or text. The pixels are stored in the memory as discrete segments of information. When the memory is scanned, each pixel position of memory is scanned and the beam (of the CRT) to the screen is either turned on or turned off at each pixel position on the screen. The viewer does not see the picture as being made up of discrete dots but sees the pattern as being made up of solid lines. However, when the information depicted on the screen is to be printed on webbing material, such as paper, ink must be positioned and fixed for every dot generated by the pixels in memory. Since voids exist between the pixels, the printed product has voids between mounds of fixed ink. Such a printed product (with voids therein) does not provide great density of the particular color that is being printed. The present system operates to reduce, or even eliminate, the voids between the mounds of ink whereby the density of the printed area is vastly improved, or enhanced. For instance, a black area does not appear to the viewer as a gray area which is the case when there are voids between the printed mounds of ink. Instead, the black area appears to the viewer as a solid black area.

The present system will also operate to readily make copies of text material irrespective of what font the original copy may bear. The only prerequisite is that the original copies be printed in the English language. The master computer can be programmed to produce a final product in any one of eight languages but the original documents should be in English.

Consider FIG. 1. In FIG. 1 there is shown a network 11 to which four stations 13, 15 17, and 19 are connected. Station 13 is the text input station. In a preferred embodiment, at Station 13, there is located a Kurzweil Text Scanner. A Kurzweil Text Scanner (KTS) is a commercially available device which is built by the Kurzweil company. The KTS can read original documents provided they are printed in the English language and is capable of reading in excess of 200 types of fonts. The KTS is arranged to read a document printed in all caps as well as lower case. As the original documents are scanned, the KTS translates the text into machine readable signals, i.e. zeros and ones. The machine readable signals are stored on a hard disk means of a personal computer (PC) connected to the KTS. Any one of a number of well-known PCs can be used such as those manufactured by IBM, UNISYS, DEC, or the like.

Station 13 also employees a disk converter. The disk converter, in a preferred embodiment, is a USLYNX Disc Converter (USLDC) and is capable of converting 600,000 different hardware/software types of discs into machine readable signals. Such a feature is provided because many users have had their original text material "typed" onto discs. One of the features of the present system is to make the text input as simple as possible. Accordingly, if the user has the original material on a disc, or discs, it can be easily entered into the text stations and converted into machine readable signals. The USLDC is manufactured by the USLYNX company.

Station 15 is the graphic display entry station. At station 15 there is located an art-imager device. In the preferred embodiment the art-image device is an Xerox HA-1 which is further identified as a Pro-Laser Image Scanner (PLIS). The PLIS, in the preferred embodiment, is manufactured by the Xerox Corporation. The PLIS is designed to receive original documents which bear patterns, or designs, thereon. In FIG. 2 there is shown a trademark of the Data Logistics, Inc., a company of Lindenwald, N.J. Note that the trademark is comprised of a horseshoe configuration 21, a set of letters DLI 23, a shadow configuration 25 of the letters DLI 23, as well as the text "Data Logistics". If the graphic display shown in FIG. 2 were to be used in a book, or as a part of advertising literature, or the like, it would be drawn by a draftsman, on a piece of paper, or webbing material, and the paper would be fed to the art-imager (PLIS) 14. In the art-imager, the design of FIG. 2 would be scanned and the design would be transformed into machine readable signals. The machine readable signals would then be stored on discs of the PC 12 which is part of station 15. The PC 14 employed at station 15 is a 6085 manufactured by Xerox Corporation. Station 15 also includes a Xerox XPIW workstation device which is a terminal to permit the user to see if the design that has been entered is, in fact, the design that the user wants. The design, after it has been entered into Station 15, can be altered with a mouse device which is part of station 15.

Station 15 provides a basis for enhancing the design to be printed, i.e., making the density of the design even greater. When a design is scanned with the art-imager, it may be scanned and stored to produce a design which is enlarged by a factor of for instance, three. When the design is being stored in binary bits on the discs of the PC, the enlargement is effected by inserting design segments between scanned segments. Thereafter, when the design is read from storage, the design may be reduced to its original size and the enlargement and subsequent reduction causes the voids to be reduced as represented by binary code signals. Accordingly, when the information is transmitted to the Laser printer, voids as they appear in the machine readable signals will be reduced in the actual printing. In addition, station 15 further enhances the printed product by altering the gray code range of the PLIS. In its normal operation, the PLIS has a gray code range of 12 to 150. In short, the Xerox Corporation markets the device to recognize and provide binary signals representing gray code differences with the value at 12 being the blackest value. The range is based on newsprint values. In the present system, the PLIS is altered so that the blackest value recognized by the scanner provides a binary value of zero. Since the system uses a 16 bit code for all dots, or segments, of scanned print, it operates that all of the text and graphic printed by the system is very black.

Station 17 is the master computer station. The master computer 18, in a preferred embodiment, is an 201S computer which is manufactured by Digital Equipment Corporation. However, the 201S is included as part of the XPS 701 which is employed at station 17. The master computer 18 provides control signals. Note in FIG. 1 that all of the stations are connected to the network 11 or the master bus. The master computer 18 provides control signals to the network 11 so that the electronic gates, which permit signals to pass into and out of the network, are correctly opened and closed, to provide an orderly transfer of signals along the network to the proper station recipient as well as from the proper transmitting stations. In addition, the master computer includes a large memory means wherein the machine readable signals from station 13 and station 15 are stored. The terminal 20 of station 17 enables the user to see what is stored in the master computer's memory and to arrange both the text and graphic information, which is stored, into proper page formats. When the information in the master computer memory is manipulated into acceptable page formats, it is transferred from the master computer to the laser printer station 19.

In addition, the station 17 includes a tape handler device which enables a great deal of stored information to be available. In a preferred embodiment the tape handler is a BY3C9-6, manufactured by Control Data Corporation.

Station 19 comprises a laser printer device and a control unit for the laser printer. In a preferred embodiment, the laser printer is a Xerox Y27-1 and the control unit, that goes therewith, is a Xerox Y-70. The laser printer 22 is designed to print fifty page formats per minute and since the laser printer can print both sides of a sheet, the system operates to print one hundred pages per minute. The Xerox Y27-1 is marketed to have a base intensity of black. In the present system, the intensity of the Xerox Y27-1 has been altered and increased to a value of "blacker than black", whereby the printed designs and printed text are enhanced. Network 11 is a controllable bus arrangement which is manufactured by Xerox Corporation.

The present invention provides a number of novel and advantageous features. First of all, the present system, by being able to enhance the printed designs at the art-imager station and being able to enhance the printed designs, as well as printed text, at the laser printer provides "print shop" quality for the printed end product. Secondly, by connecting the four stations through a network, a print shop or publisher can take advantage of the speed of a computer's compilation of graphics and text information and can readily print a multipage book without the trials and tribulations of preparing plates and/or setting up type. A practical example of this advantage is a situation where a publisher is publishing a 400 page book. After the pages have been formatted, or edited, on the master computer, the publisher prints the book at the rate of four minutes per book. The pages of the book are printed in sequence and there is no collating required. If the publisher has not printed enough books, he merely prints the number of books which are ordered by fetching the information from tape storage through the master computer. In effect, the publisher can publish the book on demand. The "on demand" capability reduces the risk of unwanted inventory. Further, the publisher can handle concepts from original documents which reduces the time required for setup compared to such requirements in prior art print shops. In addition, the present system provides great flexibility by way of making changes, or corrections, after a document has been printed and such flexibility knows no equal in prior art print shop arrangements.

What is claim is:

1. A system for printing both text and graphics of print shop quality from data processor information, comprising in combination:

art-imager means formed to scan at least one graphic display and convert said graphic display into machine readable signals;

first data processing means connected to said art-imager means and formed to receive and monitor said machine readable signals whereby a user of said system can determine that said machine readable signals satisfactorily represent said graphic display, said first data processing means further formed to process said machine readable signals to provide signals which represent an enhancement of said graphic display and further formed to store said signals which represent an enhancement of said graphic display;

text receiving means formed to receive text information and convert said text information into machine readable signals;

second data processing means formed to provide control signals and to receive said machine readable signals and formed to arrange said machine readable signals into page makeup forms;

laser printer means formed to receive said machine readable signals and formed to respond to said machine readable signals to print both text and graphic displays; and network means connected to: (1) said first data processing means; (2) said text receiving means; (3) said second data processing means; and (4) said laser printer means, whereby machine readable signals can be transmitted from said first data processing means and from said text receiving means to said second data processing means and whereby said laser printer means is enabled to receive said machine readable signals from said second data processing means to print both text and graphics.

2. A system for printing both text and graphics according to claim 1 wherein said art-imager means comprises a pro-laser image scanner.

3. A system for printing both text and graphics according to claim 1 wherein said text receiving means is formed to scan and convert printed information which might be printed in excess of two hundred different types of fonts.

4. A system for printing both text and graphics according to claim 1 wherein said text receiving means includes both a personal computer means and a disc converter means.

5. A system for printing both text and graphics according to claim 4 wherein said disc converter is formed to read at least some 600,000 different hardware/software forms of hard discs.

6. A system for printing both text and graphics according to claim 1 wherein said second data processing means includes both a tape drive means and a terminal means with a screen.

7. A system for printing both text and graphics according to claim 6 wherein there is further included a "mouse" device to enable a user of the system to edit and arrange said machine readable signals stored at said second data processing means.

8. A system for printing both text and graphics according to claim 1 wherein said laser printer means is formed to have a very high intensity to increase the ink laid down by said laser printer means.

9. A system for printing both text and graphics according to claim 1 wherein said network means include controllable gate means and wherein said controllable gate means are responsive to control signals from said second data processing means.

10. A system for printing both text and graphics of "print shop" quality from data processor information, comprising in combination:

a graphic image input station formed to generate machine readable signals from a graphic display input including a pro-laser image scanner, a first personal computer connected to said pro-laser image scanner and a first terminal device connected to said first personal computer;

a text information input station formed to generate machine readable signals from a text information input including a Kurzwell scanner, a second personal computer connected to said Kurzweil scanner and a USLYNX disc converter connected to said second personal computer;

a master computer station including a large scale computer having a memory means, a tape drive device connected to said large scale computer and second terminal device connected to said large scale computer;

laser printer station formed to receive said machine readable signals whereby said laser printer station prints both text and graphic displays; and controllable bus means connected to: (1) said graphic image input station; (2) said text information input station; (3) said master computer station; and (4) said laser printer station whereby machine readable signals can be transmitted from said graphic image input station and from said text information input station to said master computer station and whereby said laser printer station is enabled to receive said machine readable signals from said master computer station to print both text and graphics.

* * * * *